United States Patent [19] [11] Patent Number: 4,756,604
Nakatsuka et al. [45] Date of Patent: Jul. 12, 1988

[54] LIQUID CRYSTAL DEVICE USING A FRESNEL COLLIMATING LENS FOR IMPROVING UNIFORMITY OF DISPLAY CONTRAST RATIO

[75] Inventors: Hideaki Nakatsuka; Mikio Kanazaki, both of Mobara, Japan

[73] Assignee: Hitachi, Ltd., Tokyo, Japan

[21] Appl. No.: 69,044

[22] Filed: Jul. 2, 1987

[30] Foreign Application Priority Data

Jul. 4, 1987 [JP] Japan .................. 61-156001

[51] Int. Cl.$^4$ .................. G02F 1/13; G02B 17/00; G02B 3/08
[52] U.S. Cl. .................. 350/331 R; 350/445; 350/452; 350/334; 350/345
[58] Field of Search .................. 350/445, 452, 331 R, 350/334, 345, 339 R; 353/100

[56] References Cited

U.S. PATENT DOCUMENTS

| | | | |
|---|---|---|---|
| 3,731,986 | 5/1973 | Fergason | 350/331 R |
| 3,844,650 | 10/1974 | Nicholson et al. | 350/331 R |
| 4,613,207 | 9/1986 | Fergason | 350/334 |
| 4,653,861 | 3/1987 | Kando et al. | 350/337 |
| 4,660,936 | 4/1987 | Nosker | 350/345 |
| 4,693,557 | 9/1987 | Fergason | 350/334 |
| 4,704,004 | 11/1987 | Nosker | 350/345 |

Primary Examiner—Stanley D. Miller
Assistant Examiner—Trong Quang Phan
Attorney, Agent, or Firm—Antonelli, Terry & Wands

[57] ABSTRACT

There is disclosed a liquid crystal display device having very uniform contrast ratio for use with such a projector as an overhead projector. The liquid crystal display device comprises a liquid crystal display cell having a thin film of liquid crystal material sandwiched between transparent electrodes formed on opposing transparent substrates and a Fresnel collimating lens disposed before the cell in the direction of light traveling through the cell and for collimating the light in parallel light beams from a condenser lens in the projector.

4 Claims, 3 Drawing Sheets

LIQUID CRYSTAL DEVICE USING A FRESNEL COLLIMATING LENS FOR IMPROVING UNIFORMITY OF DISPLAY CONTRAST RATIO

BACKGROUND OF THE INVENTION

The present invention relates to a liquid crystal display device and, more particularly, to a transmissive type liquid crystal display device having very uniform display contrast ratio used in combination with such a projector as an overhead projector.

A usual film projector can project enlarged, changeable or moving images or pictures onto a display screen by using a liquid crystal display device instead of a transparency. By driving the liquid crystal display with electrical signals from a computer, television or other program sources, images or pictures to be projected can be changed electronically without exchanging fixed image transparencies as described, for example, at pages 161 to 162 of a textbook entitled "Fundamentals and Application of Liquid Crystal Electronics" edited by A. Sasaki, published by OHM Publishing Co. in 1979.

Also, instead of transparencies for an overhead projector, a liquid crystal display device can be used as disclosed in U.S. Pat. No. 3,844,650.

U.S. Pat. Nos. 3,731,986 and 4,653,861, for example, disclose liquid crystal display devices of a type which may be used instead of transparencies for an overhead projector.

FIG. 1 illustrates a projector system using a prior art type liquid crystal display device instead of transparencies.

Projector 1 comprises light source 2, condenser lens (Fresnel lens) 3, projection lens 9, mirror 7, display screen 8, and stage 10.

Liquid crystal display device 4 comprises housing 15 and liquid crystal display cell 14 having a thin film of twisted nematic material sandwiched between patterned transparent electrodes coated on opposing glass substrates with a pair of polarizers disposed outside the substrates as disclosed in the aforementioned U.S. Pat. Nos. 3,731,986 and 4,653,861.

The liquid crystal display device 4 is placed on the stage 10 of the projector 1 and creates the image to be projected onto the display screen 8 according to electrical signals from a computer, television or program sources.

In FIG. 1, light originating from the light source 2 is gathered and concentrated onto the liquid crystal display cell 14 by the condenser lens 3. The projection lens 9 magnifies and focus the liquid crystal image onto the display screen 8 via the mirror 7.

In the prior art projector system, light from the light source 2 is incident upon the liquid crystal display cell 14 at a angle varying according to the location in the liquid crystal area the light enters through the condenser lens 3 and this varying angle of incidence to the liquid crystal display cell 14 causes non-uniformity in optical contrast ratio in the image projected onto the display screen 8.

SUMMARY OF THE INVENTION

Accordingly an object of the present invention is to provide a large area liquid crystal display device having very uniform display contrast ratio over the entire display area and increased viewing angle for use in combination with such a projector as an overhead projector.

The above mentioned object can be accomplished by the present invention which provides a liquid crystal display device comprising a liquid crystal display cell having a thin film of liquid crystal material sandwiched between patterned transparent electrodes formed on opposing transparent substrates and a Fresnel collimating lens disposed before the liquid crystal cell in the direction of light traveling through the cell and for collimating the light in parallel light beams from the condenser lesn in the projector.

Light from a light source enters the liquid crystal cell substantially perpendicularly to the cell over the entire display area of the cell, and therefore uniformity in contrast ratio of the liquid crystal image over the entire display area is improved to a great extent, resulting in improvement of uniformity of contrast ratio over the whole projected image on the display screen.

DETAILED DESCRIPTION OF THE PREFERRED EMBODIMENTS

Figure 1:
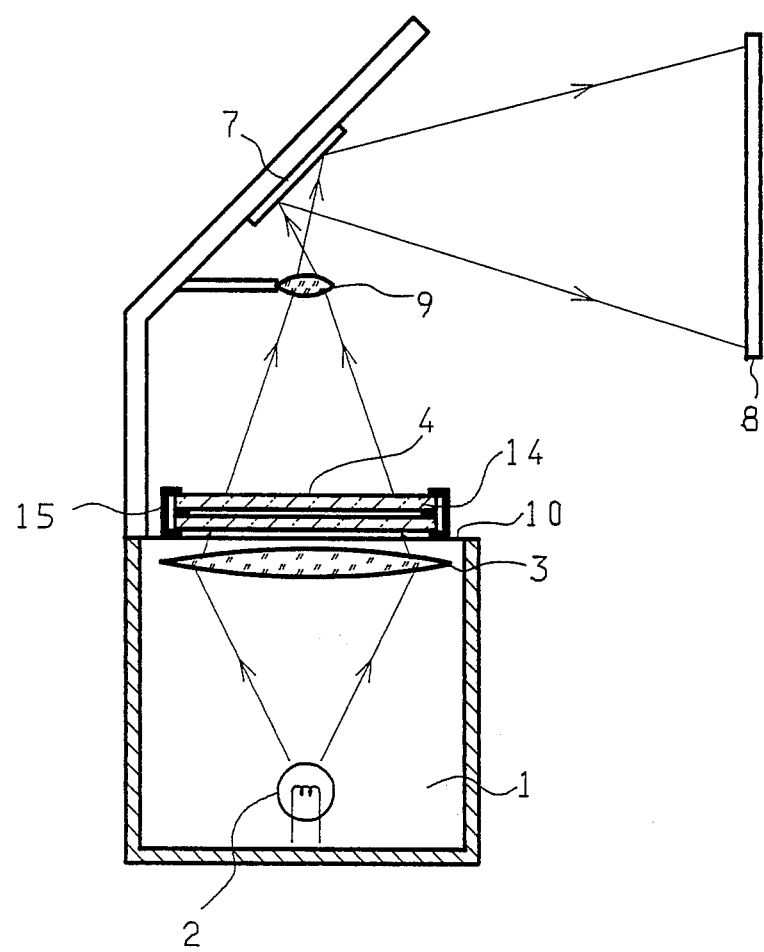
FIG. 1 is a cross sectional view of a projector system using a prior art liquid crystal display device instead of transparencies.

The preferred embodiments of the present invention will be described with reference to the accompanying drawings, wherein like reference numerals refer to liek or corresponding parts throughout.

Figure 2:
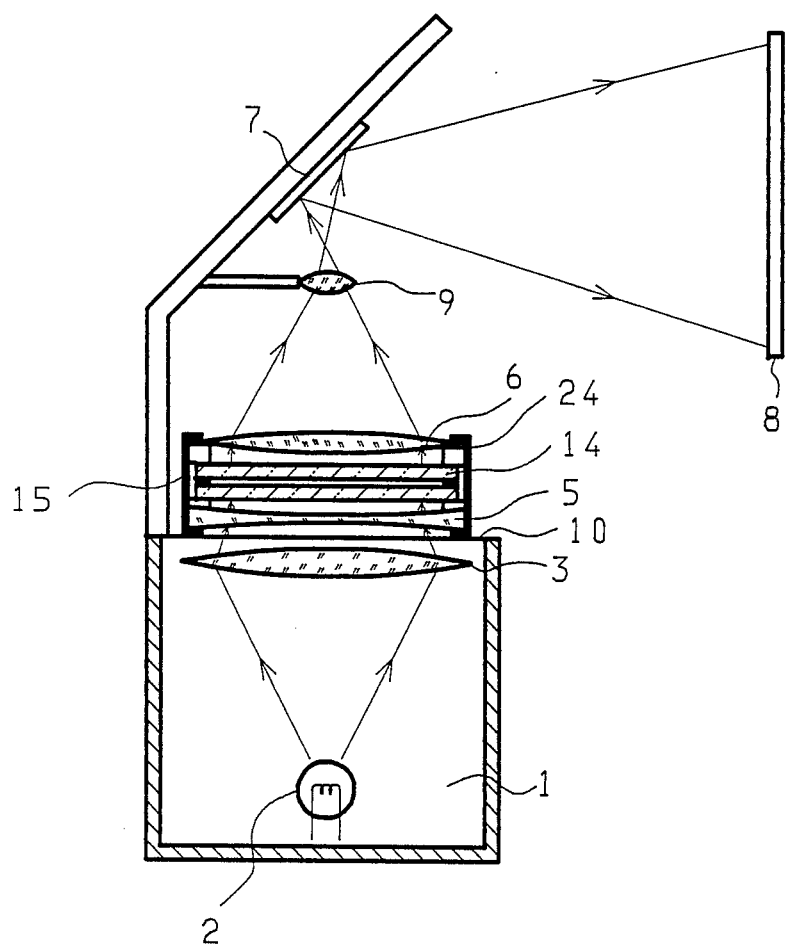
FIG. 2 is a cross sectional view of one embodiment of the liquid crystal display device of the present invention used in combination with a projector.

FIG. 2 shows a cross sectional view of one embodiment of the liquid crystal display device of the present invention used in combination with a projector.

Liquid crystal display device 24 comprises liquid crystal display cell 14 functionally identical to the liquid crystal display cell 14 shown in FIG. 1, Fresnel collimating lens 5 disposed before the liquid crystal display cell 14 and Fresnel correction lens 6 disposed behind the liquid crystal display cell 14 in the direction of light traveling through the liquid crystal display device 24 from the light source 2.

In FIG. 2, light emanating from the light source 2 is gathered and concentrated onto the Fresnel collimating lens 5 by the condenser lens 3 and is then collimated in parallel light beams by the Fresnel collimating lens 5, and therefore liquid crystal image created according to electrical signals, for example, from a computer (not shown) is illuminated with parallel light beams entering substantially pependicular to the liquid crystal cell 14 over the entire display area of the cell 14, and then the light beams modulated by the liquid crystal image are projected to form images on the display screen 8 through the correction lens 6 for directing light beams toward projection lens 9, projection lens 9 and mirror 7.

In this arrangement light from the light source 2 enters the liquid crystal cell 14 substantially perpendicularly to the liquid crystal cell 14 over the entire display area of the cell 14, and therefore uniformity in display contrast is improved.

The projector 1 in FIG. 2 is a commercially available usual projector which uses fixed image transparencies. By modifying the projection lens 9, the correction lens 9 could be omitted.

Figure 3:
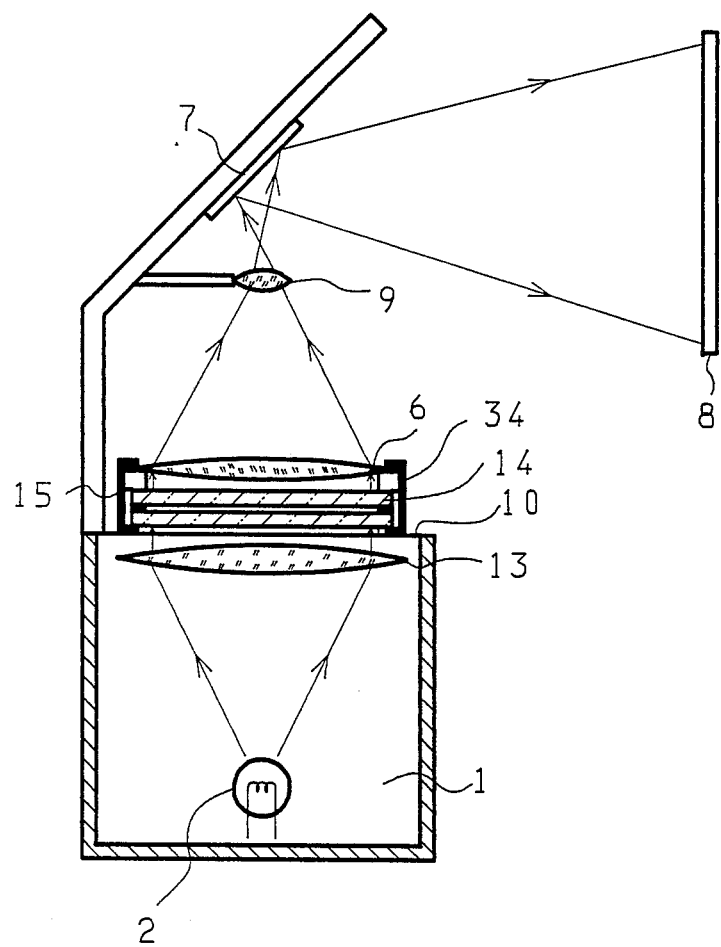
FIG. 3 is a cross sectional view of a further embodiment of the liquid crystal display device of the present invention used in combination with a projector.

FIG. 3 shows a cross sectional view of a further embodiment of the liquid crystal display device of the present invention used in combination with a modified projector.

In FIG. 3, Fresnel lens 13 functions as a combination of a condenser lens and a collimating lens and liquid crystal display device 34 comprises the liquid crystal display cell 14 and the correction lens 6. Light from the light source 2 is gathered and collimated in parallel light beams by the Fresnel lens 13 and illuminates the liquid crystal image which is to be projected onto the display screen 8 in the same manner as explained referring to FIG. 2.

According to the present invention it is possible to improve uniformity in display contrast ratio of enlarged projected images over the entire display area.

What is claimed is:

1. A liquid crystal display device for use in a projector of the type wherein light from a light source is gathered by a condenser lens, is modulated by the liquid crystal display device placed on a stage and focused on a display screen by a projection lens, said liquid crystal display device comprising a liquid crystal display cell having a thin film of liquid crystal material sandwiched between patterned transparent electrodes formed on opposing transparent substrates, and a Fresnel collimating lens disposed before said liquid crystal cell in the direction of said light traveling through said liquid crystal cell from said light source and for collimating said light in parallel light beams from said condenser lens.

2. A liquid crystal display device according to claim 1 and further comprising a Fresnel correction lens for directing light beams toward said projection lens.

3. A liquid crystal display device according to claim 1 and further comprising a pair of polarizers disposed before and behind said liquid crystal display cell in the direction of said light traveling through said liquid crystal display cell.

4. A liquid crystal display device according to claim 1 wherein said liquid crystal display cell and said Fresnel collimating lens are assembled as a unitary structure for ease of detachment from said projector.

* * * * *